(12) United States Patent
Schoeley et al.

(10) Patent No.: US 9,249,301 B2
(45) Date of Patent: Feb. 2, 2016

(54) CROSSLINKABLE COMPOSITIONS BASED ON ORGANOSILICON COMPOUNDS

(71) Applicant: Wacker Chemie AG, Munich (DE)

(72) Inventors: Peter Schoeley, Diera-Zehren (DE); Gabriele Dineiger, Meissen (DE); Uwe Scheim, Coswig (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 14/403,093

(22) PCT Filed: May 16, 2013

(86) PCT No.: PCT/EP2013/060132
§ 371 (c)(1),
(2) Date: Nov. 21, 2014

(87) PCT Pub. No.: WO2013/174708
PCT Pub. Date: Nov. 28, 2013

(65) Prior Publication Data
US 2015/0218377 A1    Aug. 6, 2015

(30) Foreign Application Priority Data
May 25, 2012 (DE) .......... 10 2012 208 864

(51) Int. Cl.
| | | |
|---|---|---|
| *C08G 77/16* | (2006.01) | |
| *C08L 83/04* | (2006.01) | |
| *C09D 183/04* | (2006.01) | |
| *C09J 183/00* | (2006.01) | |

(52) U.S. Cl.
CPC .............. *C08L 83/04* (2013.01); *C09D 183/04* (2013.01); *C09J 183/00* (2013.01); *C08G 77/16* (2013.01)

(58) Field of Classification Search
CPC ...... C08G 77/16; C08L 83/06; C08K 5/5419; C08K 5/357; C08K 5/544
See application file for complete search history.

(56) References Cited

U.S. PATENT DOCUMENTS

| | | |
|---|---|---|
| 5,969,057 A | 10/1999 | Schoeley et al. |
| 8,217,113 B2 | 7/2012 | Scheim et al. |
| 2011/0224366 A1* | 9/2011 | Scheim .................. C08L 83/04 524/588 |

FOREIGN PATENT DOCUMENTS

| | | |
|---|---|---|
| DE | 19616789 A1 | 11/1997 |
| DE | 102007037197 A1 | 2/2009 |

* cited by examiner

Primary Examiner — Kuo-Liang Peng
(74) Attorney, Agent, or Firm — Brooks Kushman P.C.

(57) ABSTRACT

Curable RTV-1 organopolysiloxane compositions which maintain the properties and adhesive strength even in hot moist conditions include a bis-hydroxyl-functional organopolysiloxane, an organosilicon compound comprising an α-alkoxysilane bonded through a methylene group to a heteroatom of a heterocyclic compound, and a branched, non-resinous alkoxyfunctional organopolysiloxane containing at least 20 mol percent of $R^5SiO_{3/2}$ moieties where $R^5$ is a hydrocarbyl radical.

12 Claims, No Drawings

CROSSLINKABLE COMPOSITIONS BASED ON ORGANOSILICON COMPOUNDS

CROSS REFERENCE TO RELATED APPLICATIONS

This application is the U.S. National Phase of PCT Appln. No. PCT/EP2013/060132 filed May 16, 2013, which claims priority to German Application No. 10 2012 208 864.4 filed May 25, 2012, the disclosures of which are incorporated in their entirety by reference herein.

BACKGROUND OF THE INVENTION

1. Field of the Invention

The invention relates to crosslinkable compositions based on organosilicon compounds that cure by elimination of alcohols to form materials possessing very high stability, methods of producing them, and also to their use.

2. Description of the Related Art

One-component sealant compositions that are storable in the absence of water and cure on admission of water at room temperature by elimination of alcohols to form elastomers are already known. These products are used in large volumes in the building construction industry for example. Polymers terminated by silyl groups bearing reactive substituents such as OH groups, or hydrolyzable groups such as alkoxy groups form the basis for these mixtures. These sealant compositions may further contain fillers, plasticizers, crosslinkers, catalysts and also various additives.

The mechanical properties of the elastomeric products obtained on curing are virtually constant thereafter. This property makes them very useful as joint sealants for example. However, these compositions are frequently also used as coating materials or as adhesives. In such cases, the cured compositions may often be exposed for prolonged periods to the action of both high temperatures and high relative humidities. Under these conditions, the positive range of properties possessed by the cured products may still subsequently change in an undesirable manner.

It is known, for instance, that 1- and 2-component compositions based on crosslinkable organopolysiloxanes having hydrolyzable groups are very quick to irreversibly lose their adherence to glass under the action of heat and moisture. An initial improvement was achieved by using a combination of aminopropyltrimethoxysilane and glycidoxypropyltrimethoxysilane. In addition, DE 196 16789 A1 shows that test specimens stored in hot water do not suffer adhesive failure when the compositions additionally contain not only a silicone resin but also an alkoxysilane comprising a long-chain alkyl radical. Admixture of only one of the two organosilicon compounds alone is insufficient to bring about any improvement in adherence, only the combination of the two additives works.

DE-A1 102007037197 describes compositions based on crosslinkable α-silanes. This reference also mentions the possibility that a multiplicity of monomeric, substituted or unsubstituted silanes may be included a partial hydrolyzate or as a co-hydrolyzate. Specific advantages of selected hydrolyzates are not derived therefrom, however. The exemplary embodiments employ small amounts of an oligomeric hydrolyzate from methyltrimethoxysilane in a blend with an adhesion promoter. However, the cured compositions have the disadvantage that, at high temperatures and very high relative humidities, they can lose some of their elasticity. This manifests itself in a reduced rubber hardness in particular. How this loss of elasticity may be prevented for these compositions has hitherto not been shown.

SUMMARY OF THE INVENTION

The invention provides condensation-crosslinkable compositions obtainable by use of (A) organosilicon compounds having at least two OH groups, (B) heterocyclic compounds of the formula

$$A[CR^1{}_2SiR_a(OR^2)_{3-a}]_x \quad (I),$$

where

A represents a radical based on a heterocycle $AH_x$, this radical containing one or more ring-forming elements of main groups 3 and/or 5 and having x hydrogen atoms replaced by chemical bonds to the $CR^1{}_2$ radical(s), wherein at least one of these bonds is situated on a ring-forming element of main group 3 or 5, R represents identical or different, monovalent, optionally substituted hydrocarbyl radicals, $R^1$ represents a hydrogen atom or monovalent, optionally substituted hydrocarbyl radicals and may be the same or different at each occurrence, $R^2$ represents monovalent, optionally substituted hydrocarbyl radicals and may be the same or different at each occurrence, a represents 0 or 1, preferably 0, and x represents 1, 2 or 3, preferably 1 or 2, more preferably 1, and/or partial hydrolyzates thereof and also (C) at least one compound containing units of the formulae

$$R^5Si(OR^4)_2O_{1/2} \quad (III),$$

$$R^5Si(OR^4)O_{2/2} \quad (IV) \text{ and}$$

$$R^5SiO_{3/2} \quad (V),$$

where $R^4$ at each occurrence independently represents an alkyl radical and may be the same or different, and $R^5$ at each occurrence independently represents a hydrocarbyl radical with the proviso that said compound (C) contains at least 20 mol % of units of formula (V).

DETAILED DESCRIPTION OF THE PREFERRED EMBODIMENTS

The partial hydrolyzates of compounds of formula (I) may comprise partial homohydrolyzates as well as partial cohydrolyzates. When component (B) of the present invention comprises partial hydrolyzates of compounds of formula (I), those having up to 10 silicon atoms are preferred.

Radical R preferably comprises optionally substituted, monovalent hydrocarbyl radicals of 1 to 18 carbon atoms, more preferably alkyl radicals, the vinyl radical, the 3,3,3-trifluoroprop-1-yl radical and the phenyl radical, in particular the methyl radical.

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical;

dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl or 2-propenyl radical; aryl radicals such as the phenyl, naphthyl, anthryl or phenanthryl radicals; alkaryl radicals such as the o-, m-, and p-tolyl radicals, xylyl radicals and ethylphenyl radicals; and aralkyl radicals such as the benzyl radical, the α-phenylethyl radical and the β-phenylethyl radical.

Examples of substituted radicals R are haloalkyl radicals such as the 3,3,3-trifluoroprop-1-yl radical, the 1,1,1,3,3,3-hexafluoroprop-2-yl radical and the heptafluoroprop-2-yl radical, haloaryl radicals such as the o-, m- or p-chlorophenyl radicals, and the 2-methoxyethyl radical, the 2-methoxyprop-1-yl radical and also the 2-(2-methoxyethoxy)ethyl radical.

Examples of radicals $R^1$ are hydrogen and also the radicals specified for R. Radical $R^1$ preferably comprises a hydrogen atom or a hydrocarbyl radical of 1 to 20 carbon atoms, especially a hydrogen atom.

Examples of radicals $R^2$ are the radicals specified for R. Radical $R^2$ preferably comprises alkyl radicals of 1 to 6 carbon atoms, more preferably the methyl and ethyl radicals, in particular the ethyl radical.

Radical A comprises cyclic compounds having ring-forming atoms of at least two different elements, with the proviso that at least one ring-forming atom represents an element from main groups 3 and/or 5 which has a bonding site to the carbon atom of a —$CR^1_2$— radical in formula (I). Radical A preferably comprises cyclic organic compounds whose ring structures in addition to carbon atoms further contain at least one element from main groups 3 and/or 5 and more preferably at least one further heteroatom.

The designation "heteroatoms" is to be understood hereinbelow as meaning any ring-forming atoms other than carbon. The ring-forming heteroatoms in radical A are each preferably nitrogen, phosphorus, oxygen, silicon or sulfur, more preferably nitrogen or oxygen.

Radical A may also comprise optionally substituted, saturated or partly unsaturated heterocycles. When the ring A is substituted, the substituents preferably comprise halogen atoms, hydrocarbyl radicals and organyloxy radicals, while these substituents may also comprise polyvalent radicals which may be attached to one or more ring-forming atoms.

Radical A may also contain ring carbon atoms comprising oxygen or sulfur atoms which are bonded via double bonding, subject to the proviso that such ring carbon atoms do not have a direct bond to a ring-forming heteroatom from main group 3 or 5 that is bonded to a $CR^1_2$ radical of formula (I).

Radical A may also contain ring carbon atoms comprising nitrogen or phosphorus atoms which are bonded via double bonding, but this is not preferable.

Radical A preferably comprises 3-, 4-, 5-, 6-, 7- or 8-membered heterocycles which by way of ring-forming atoms in addition to carbon include nitrogen and/or phosphorus and/or oxygen and/or sulfur as heteroatoms, with the proviso that at least one ring-forming atom represents an element from main groups 3 and/or 5, and there may also be further rings fused on.

It is particularly preferable for the heterocycles that form the basis for the radicals A to comprise 5- and 6-membered heterocycles which contain a further ring heteroatom in addition to the heteroatom from main groups 3 and/or 5 needed to bond to the $CR^1_2$ radical of the compounds of formula (I).

Examples of heterocycles that form the basis for the radicals A are aziridine, azetidine, pyrrole, pyrrolidine, 1,3-oxazolidine, 1,3-thiazolidine, 1H-1,2-diazole, $\Delta^2$-1,2-diazoline, $\Delta^4$-1,2-diazoline, 1,3-diazole, $\Delta^2$-1,3-diazoline, $\Delta^4$-1,3-diazoline, 1,3-diazolidine, 1,2,3-triazole, 1,2,4-triazole, tetrazole, $\Delta^4$-1,2-diazolin-3-one, piperidine, tetrahydro-1,4-oxazine, tetrahydro-1,4-thiazine, hexahydro-1,3-diazine, hexahydro-1,4-diazine, 1-methylhexahydro-1,4-diazine, hexahydro-1,3,5-triazine, hexahydro-1,3-diazin-4-one, 4-methylhexahydro-1,4-diazin-3-one, 1H-azepine, hexahydroazepine, octahydroazocine, 1H-benzo[b]pyrrole, 2,3-dihydrobenzo[b]pyrrole, 9H-dibenzopyrrole, benzo[d]-1,2-diazole, benzo[d]-1,3-diazole and benzo[d]-1,2,3-triazole.

Particular preference is given to pyrrolidine, piperidine, tetrahydro-1,4-oxazine, tetrahydro-1,4-thiazine, tetrahydro-1,4-diazine and 1-methyltetrahydro-1,4-diazine, especially tetrahydro-1,4-oxazine.

Examples of heterocyclic compounds (B) are 1-(triethoxysilylmethyl)aziridine, 1-(triethoxysilylmethyl)-azetidine, 1-(triethoxysilylmethyl)pyrrole, 1-(triethoxysilyl-methyl)pyrrolidine, 3-(triethoxysilylmethyl)-1,3-oxazolidine, 3-(triethoxysilylmethyl)-1,3-thiazolidine, 1-(triethoxysilylmethyl)-1H-1,2-diazole, 1-(triethoxysilylmethyl)-$\Delta^2$-1,2-diazoline, 1-(triethoxysilylmethyl)-$\Delta^4$-1,2-diazoline, 1-(triethoxysilylmethyl)-1,3-diazole, 1-(triethoxysilylmethyl)-$\Delta^2$-1,3-diazoline, 1-(triethoxysilylmethyl)-$\Delta^4$-1,3-diazoline, 1-(triethoxysilylmethyl)-1,3-diazolidine, 1,3-bis(triethoxysilylmethyl)-1,3-diazolidine, 1-(triethoxysilylmethyl)-1H-1,2,3-triazole, 2-(triethoxysilylmethyl)-2H-1,2,3-triazole, 1-(triethoxysilylmethyl)-1H-1,2,4-triazole, 4-(triethoxysilyl-methyl)-4H-1,2,4-triazole, 1-(triethoxysilylmethyl)-1H-tetrazole, 2-(triethoxysilylmethyl)-2H-tetrazole, 1-(triethoxysilylmethyl)-$\Delta^4$-1,2-diazolin-3-one, 1-(triethoxysilylmethyl)piperidine, 4-(triethoxysilylmethyl)tetrahydro-1,4-oxazine, 4-(1-(triethoxysilyl)ethyl)tetrahydro-1,4-oxazine, 4-(2-(triethoxysilyl)prop-2-yl)tetrahydro-1,4-oxazine, 4-(1-phenyl-1-(triethoxysilyl)ethyl)tetrahydro-1,4-oxazine, 4-(tri-ethoxysilylmethyl)tetrahydro-1,4-thiazine, 1-(triethoxysilyl-methyl)hexahydro-1,3-diazine, 1-(triethoxysilylmethyl)hexahydro-1,4-diazine, 1-methyl-4-(triethoxysilylmethyl)hexahydro-1,4-diazine, 1,4-bis(triethoxysilylmethyl)hexahydro-1,4-diazine, 1,4-bis(1-(triethoxysilyl)ethyl)hexahydro-1,4-diazine, 1-(triethoxysilylmethyl) hexahydro-1,3,5-triazine, 1,3-bis(triethoxysilylmethyl) hexahydro-1,3,5-triazine, 1,3,5-tris(triethoxysilylmethyl) hexahydro-1,3,5-triazine, 1-(tri-ethoxysilylmethyl) hexahydro-1,3-diazin-4-one, 1-(triethoxy-silylmethyl)-4-methylhexahydro-1,4-diazin-3-one, 1-(triethoxy-silylmethyl)-1H-azepine, 1-(triethoxysilylmethyl) hexahydroazepine, 1-(triethoxysilylmethyl) octahydroazocine, 1-(tri-ethoxysilylmethyl)benzo[b] pyrrole, 1-(triethoxysilylmethyl)-2,3-dihydrobenzo[b] pyrrole, 9-(triethoxysilylmethyl)dibenzopyrrole, 1-(triethoxysilylmethyl)benzo[d]-1,2-diazole, 1-(tri-ethoxysilylmethyl)benzo[d]-1,3-diazole and 1-(triethoxysilyl-methyl)benzo[d]-1,2,3-triazole. Examples further include all the abovementioned compounds where trimethoxysilyl, diethoxymethylsilyl or dimethoxymethylsilyl replaces the triethoxysilyl radical.

Heterocyclic compounds (B) used according to the present invention are commercially available compounds and/or obtainable by routine chemical methods.

Organosilicon compounds (A) used according to the present invention may comprise any organosilicon compound having at least two OH groups which is useful in condensation-crosslinkable compositions.

Organosilicon compounds (A) preferably contain units of the formula $$R^3_b(OH)_c SiO_{(4-b-c)/2} \qquad \text{(II),}$$

where

R³ at each occurrence may be the same or different and represents optionally substituted hydrocarbyl radicals which may be interrupted by oxygen atoms, b represents 0, 1, 2 or 3, preferably 2, and c represents 0, 1, 2 or 3, preferably 0 or 1, with the proviso that the sum of b+c is ≤3 and at least two condensation-capable radicals OH are present per molecule.

R³ preferably comprises monohydric hydrocarbyl radicals of 1 to 18 carbon atoms, which are optionally substituted with halogen atoms, amino groups, ether groups, ester groups, epoxy groups, mercapto groups, cyano groups or (poly)glycol radicals, the latter being constructed of oxyethylene and/or oxypropylene units. R³ more preferably comprises alkyl radicals of 1 to 12 carbon atoms, especially the methyl radical. Examples of radical R³ are the examples specified for radical R.

It is particularly preferable for organosilicon compounds (A) to comprise essentially linear, OH-terminated organopolysiloxanes, especially α,ω-di-hydroxydialkylpolysiloxanes. Examples of organosilicon compounds (A) are $(HO)Me_2SiO[SiMe_2O]_{30-2000}SiMe_2(OH)$ where Me is methyl.

The organosilicon compounds (A) preferably have a viscosity of preferably $10^3$ to $10^6$ mPas, more preferably of $10^4$ to 350,000 mPas, all at 25° C. The organosilicon compounds (A) comprise commercially available products and/or are obtainable by routine procedures of silicon chemistry.

The compositions of the present invention preferably contain component (B) in amounts of 0.1 to 30 parts by weight, more preferably 0.5 to 20 parts by weight, especially 1 to 10 parts by weight, all based on 100 parts by weight of component (A).

Examples of radicals $R^4$ and $R^5$ are independently the examples specified above for radical R. Radical $R^4$ preferably comprises alkyl radicals with 1 to 4 carbon atoms and more preferably comprises the methyl radical or the ethyl radical. $R^5$ preferably comprises hydrocarbyl radicals of 1 to 18 carbon atoms and more preferably comprises alkyl radicals of 1 to 8 carbon atoms.

Compounds (C) contain units of formulae (III), (IV) and (V) preferably in amounts altogether of at least 80 mol %, more preferably at least 95 mol %, especially at least 98.5 mol %.

Compounds (C) invention contain at least 20 mol % of units of formula (V), while from 20 to 60 mol % is preferable and from 25 to 50 mol % is more preferable.

The compounds (C) preferably contain from 5 to 30 mol % of units of formula (III), and preferably contain from 20 to 50 mol % of units of formula (IV).

The compounds (C) preferably contain from 20 to 60 mol % of units of formula (V), from 5 to 30 mol % of units of formula (III) and from 20 to 50 mol % of units of formula (IV).

The compounds (C) may, in addition to the units of formulae (III), (IV) and (V), also contain still further units, for example $R^5_2Si(OR^4)O_{1/2}$ (VI), $R^5_2SiO_{2/2}$ (VII) or $SiO_{4/2}$ (VIII), all with $R^4$ and $R^5$ each representing one of the above-mentioned meanings. It is preferable for the compounds (C) to consist of units of formulae (III), (IV) and (V) and also optionally (VI), optionally (VII) and optionally (VIII).

The compounds (C) are preferably liquid at room temperature and the pressure of the ambient atmosphere, i.e. between 900 and 1100 hPa, and preferably have a viscosity of 1 to 100 mPa's, more preferably 5 to 50 mPa's, and especially from 10 to 40 mPa's, all at 25° C. and measured as per DIN 53019.

The compounds (C) preferably have a density of 0.9 to 1.3 g/cm³, more preferably 0.95 to 1.20 g/cm³, and especially of 1.0 to 1.15 g/cm³, all at 25° C.

The compounds (C) preferably comprise resinous products and more preferably comprise silicone resins that are liquid at room temperature and a pressure of 1013 hPa, which greatly facilitates industrial usability.

The organosilicon compounds (C) comprise commercially available products and/or are obtainable by routine procedures of silicon chemistry. For example, said compounds (C) are obtainable by hydrolysis and subsequent condensation of alkyltrialkoxysilanes. They are preferably prepared from methyl-, ethyl- and vinyltrialkoxysilanes, more preferably from methoxy- and ethoxysilanes.

Although formulae (III) to (VIII) do not say so, the compounds (C) used according to the present invention may contain up to 1 wt % of residual —Si—OH as impurities from their synthesis.

To produce the compositions of the present invention, the compounds (C) may be used directly or in admixture with low-boiling organic solvents, such as alcohols or toluene. When said compounds (C) are used in admixture with organic solvents, which is not preferable, the amounts are preferably not more than 5 wt %, based on the overall weight of the mixture.

The compositions of the present invention preferably contain component (C) in amounts of 0.01 to 50 parts by weight, more preferably 0.1 to 20 parts by weight, especially 1 to 10 parts by weight, all based on 100 parts by weight of component (A).

In addition to the components (A), (B) and (C), the compositions of the present invention may otherwise contain any substances useful in condensation-crosslinkable compositions, for example catalysts (D), basic nitrogen compound (E), fillers (F), adhesion promoters (G), plasticizers (H), further crosslinkers (J), additives (K) and solvents (L), in which case components (J), (E) and (G) are other than components (B) and (C) and component (L) is other than plasticizer (H).

Examples of catalysts (D) are the hitherto already known titanium compounds, such as tetraisopropyl titanate, and also zirconium and hafnium compounds, zinc compounds such as zinc 2-ethylhexoate, and organotin compounds, such as di-n-butyltin dilaurate and di-n-butyltin diacetate, di-n-butyltin oxide, dioctyltin diacetate, dioctyltin dilaurate, dioctyltin oxide and also reaction products of these compounds with alkoxysilanes such as tetraethoxysilane. Di-n-octyltin oxide in tetraethyl silicate hydrolyzate, di-n-octyltin oxide in a mixture of 50 wt % methyltriethoxysilane hydrolyzate and 50 wt % 3-aminopropyltriethoxysilane, di-n-octyltin oxide in tetraisopropyl silicate and the reaction product of di-n-butyltin diacetate and tetraethoxysilane are preferable.

When the compositions of the present invention contain catalyst (D), the amounts are preferably 0.0001 to 2 parts by weight, more preferably 0.001 to 1 part by weight, all based on 100 parts by weight of the composition according to the present invention. The compositions of the present invention preferably do contain catalyst (D).

The basic nitrogen compounds (E) which are optionally used according to the present invention, preferably comprise basic nitrogen compounds selected from the group of compounds of the formula

 (IX), where $R^6$ at each occurrence may be the same or different and represents hydrogen or a hydrocarbyl radical, optionally substituted with hydroxyl groups, halogen atoms, amino groups, ether groups, ester groups, epoxy groups, mercapto groups, cyano groups or polyglycol radicals, the latter being constructed of oxyethylene and/or oxypropylene units, with the proviso that at most two $R^6$s in formula (IX) represent hydrogen, although when two or more $R^6$'s are present, these may also be linked with one another to form cyclic structures, and also organosilicon compounds having at least one organic radical comprising basic nitrogen which differ from component (B) and comprise units of the formula

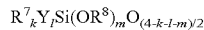

$$R^7_k Y_l Si(OR^8)_m O_{(4-k-l-m)/2} \quad (X),$$

where $R^7$ represents a monovalent, SiC-bonded organic radical free from basic nitrogen and may be the same or different at each occurrence, $R^8$ has a meaning specified for $R^2$ and may be the same or different at each occurrence, Y represents a monovalent, SiC-bonded radical comprising basic nitrogen and may be the same or different at each occurrence, k represents 0, 1, 2, or 3, l represents 0, 1, 2, 3 or 4, and m represents 0, 1, 2 or 3, with the proviso that the sum of k+l+m is not more than 4 and at least one radical Y is present per molecule.

Examples of radicals $R^6$ and $R^7$ are each independently the examples specified for R with respect to optionally substituted hydrocarbyl radicals. Optionally substituted hydrocarbyl radicals $R^6$ are preferably of 1 to 18 carbon atoms. Radical $R^7$ preferably comprises hydrocarbyl radicals of 1 to 18 carbon atoms, while methyl, ethyl and n-propyl radicals are particularly preferable, especially the methyl radical.

Examples of radical $R^8$ are the examples specified for radical $R^2$. Radical $R^8$ preferably comprises the methyl or ethyl radical.

Examples of radicals Y are radicals of the formulae $H_2NCH_2$—, $H_2N(CH_2)_2$—, $H_2N(CH_2)_3$—, $H_2N(CH_2)_2NH(CH_2)_2$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $H_3CNH(CH_2)_2$—, $C_2H_5NH(CH_2)_2$—, $H_2N(CH_2)_4$—, $H_2N(CH_2)$—, $H(NHCH_2CH_2)_3$—, $C_4H_9NH(CH_2)_2NH(CH_2)_2$—, cyclo-$C_6H_{11}NH(CH_2)_3$—, cyclo-$C_6H_{11}NH(CH_2)_2$—, $(CH_3)_2N(CH_2)_3$—, $(CH_3)_2N(CH_2)_2$—, $(C_2H_5)_2N(CH_2)_3$— and $(C_2H_5)_2N(CH_2)_2$—.

Y preferably comprises $H_2N(CH_2)$—, $H_2N(CH_2)_2NH(CH_2)_3$—, $H_3CNH(CH_2)_3$—, $C_2H_5NH(CH_2)_3$— and cyclo-$C_6H_{11}NH(CH_2)_3$— radicals, of which the $H_2N(CH_2)_2NH(CH_2)_3$— and cyclo-$C_6H_{11}NH(CH_2)_3$— radicals are particularly preferable.

When the organosilicon compounds comprising units of formula (X) comprise silanes, k is preferably 0, 1 or 2, more preferably 0 or 1, l is preferably 1 or 2, more preferably 1, and m is preferably 1, 2 or 3, more preferably 2 or 3, with the proviso that the sum of k+l+m is equal to 4.

Examples of the formula (X) silanes optionally used according to the present invention are $H_2N(CH_2)_3$—Si$(OCH_3)_3$, $H_2N(CH_2)_3$—Si$(OC_2H_5)_3$, $H_2N(CH_2)_3$—Si$(OCH_3)_2CH_3$, $H_2N(CH_2)_3$—Si$(OC_2H_5)_2CH_3$, $H_2N(CH_2)_2NH(CH_2)_3$—Si$(OCH_3)_3$, $H_2N(CH_2)_2NH(CH_2)_3$—Si$(OC_2H)_3$, $H_2N(CH_2)_2NH(CH_2)_3$—Si$(OCH_3)_2CH_3$, $H_2N(CH_2)_2NH(CH_2)_3$—Si$(OC_2H_5)_2CH_3$, $H_2N(CH_2)_2NH(CH_2)_2NH(CH_2)_3$—Si$(OC_2H_5)_3$, cyclo-$C_6H_{11}NH(CH_2)_3$—Si$(OCH_3)_3$, cyclo-$C_6H_{11}NH(CH_2)_3$—Si$(OC_2H_5)_3$, cyclo-$C_6H_{11}NH(CH_2)_3$—Si$(OCH_3)_2CH_3$, cyclo-$C_6H_{11}NH(CH_2)_3$—Si$(OC_2H_5)_2CH_3$, HN$((CH_2)_3$—Si$(OCH_3)_3)_2$ and HN$((CH_2)_3$—Si$(OC_2H_5)_3)_2$ and also partial hydrolyzates thereof, where $H_2N(CH_2)_2NH(CH_2)_3$—Si$(OCH_3)_3$, $H_2N(CH_2)_2NH(CH_2)_3$—Si$(OC_2H_5)_3$, $H_2N(CH_2)_2NH(CH_2)_3$—Si$(OCH_3)_2CH_3$, $H_2N(CH_2)_2NH(CH_2)_3$—Si$(OC_2H_5)_2CH_3$, cyclo-$C_6H_{11}NH(CH_2)_3$—Si$(OC_2H_5)_3$, cyclo-$C_6H_{11}NH(CH_2)_3$—Si$(OCH_3)_2CH_3$ and also cyclo-$C_6H_{11}NH(CH_2)_3$—Si$(OC_2H_5)_2CH_3$ are preferable and $H_2N(CH_2)_2NH(CH_2)_3$—Si$(OC_2H_5)_3$, $H_2N(CH_2)_2NH(CH_2)_3$—Si$(OC_2H_5)_2CH_3$, cyclo-$C_6H_{11}NH(CH_2)_3$—Si$(OC_2H_5)_3$ and cyclo-$C_6H_{11}NH(CH_2)_3$—Si$(OC_2H_5)_2CH_3$ and also their respective partial hydrolyzates are particularly preferable.

When the organosilicon compound comprising units of formula (X) comprises organopolysiloxanes, the average value of k is preferably between 0.5 and 2.5, more preferably between 1.4 and 2.0, the average value of l is preferably between 0.01 and 1.0, more preferably between 0.01 and 0.6, and the average value of m is preferably between 0 and 2.0, more preferably between 0 and 0.2, with the proviso that the sum of k, l and m is not more than 3.

Organopolysiloxanes comprising units of formula (X) and usable according to the present invention preferably have a viscosity at 25° C. of from 5 to $10^5$ mPas, more preferably from 10 to $10^4$ mPas.

Examples of organopolysiloxanes comprising units of formula (X) and usable according to the present invention are
$H_2N(CH_2)_3$—Si$(OCH_3)_2$—O—Si$(CH_3)(OCH_3)_2$,
$H_2N(CH_2)_3$—Si$(OC_2H_5)_2$—O—Si$(CH_3)(OCH_3)_2$,
$H_2N(CH_2)_3$—Si$(OC_2H_5)_2$—O—Si$(CH_3)(OC_2H_5)_2$,
$H_2N(CH_2)_3$—Si$(OCH_3)(CH_3)$—O—Si$(CH_3)(OCH_3)_2$,
$H_2N(CH_2)_3$—Si$(OCH_3)(CH_3)$—O—Si$(OCH_3)_3$,
$H_2N(CH_2)_3$—Si$(OC_2H_5)(CH_3)$—O—Si$(OCH_3)_3$,
$H_2N(CH_2)_2NH(CH_2)_3$—Si$(OCH_3)_2$—O—Si$(CH_3)$
$(OCH_3)_2$,
$H_2N(CH_2)_2NH(CH_2)_3$—Si$(OC_2H_5)_2$—O—Si$(CH_3)$
$(OCH_3)_2$,
$H_2N(CH_2)_2NH(CH_2)_3$—Si$(OC_2H_5)_2$—O—Si$(CH_3)$
$(OC_2H_5)_2$,
$H_2N(CH_2)_2NH(CH_2)_3$—Si$(OCH_3)(CH_3)$—O—Si$(CH_3)$
$(OCH_3)_2$,
$H_2N(CH_2)_2NH(CH_2)_3$—Si$(OCH_3)(CH_3)$—O—Si$(OCH_3)_3$,
$H_2N(CH_2)_2NH(CH_2)_3$—Si$(OC_2H_5)(CH_3)$—O—Si
$(OCH_3)_3$,
cyclo-$C_6H_{11}NH(CH_2)_3$—Si$(OCH_3)_2$—O—Si$(CH_3)$
$(OCH_3)_2$,
cyclo-$C_6H_{11}NH(CH_2)_3$—Si$(OC_2H_5)_2$—O—Si$(CH_3)$
$(OCH_3)_2$,
cyclo-$C_6H_{11}NH(CH_2)_3$—Si$(OC_2H_5)_2$—O—Si$(CH_3)$
$(OC_2H_5)_2$,
cyclo-$C_6H_{11}NH(CH_2)_3$—Si$(OCH_3)(CH_3)$—O—Si$(CH_3)$
$(OCH_3)_2$,
cyclo-$C_6H_{11}NH(CH_2)_3$—Si$(OCH_3)(CH_3)$—O—Si$(OCH_3)_3$
and
cyclo-$C_6H_{11}NH(CH_2)_3$—Si$(OC_2H_5)(CH_3)$—O—Si
$(OCH_3)_3$,
$H_2N(CH_2)_3$—Si$(OCH_3)_2$—(O—Si$(CH_3)_2)_{1-100}$—O—Si
$(OCH_3)_2$—$(CH_2)_3NH_2$,
$H_2N(CH_2)_2NH(CH_2)_3$—Si$(OCH_3)_2$—(O—Si$(CH_3)_2)_{1-100}$
—O—Si$(OCH_3)_2$—$(CH_2)_3$
NH$(CH_2)_2NH_2$ and cyclo-$C_6H_{11}NH(CH_2)_3$—Si$(OCH_3)_2$—
(O—Si$(CH_3)_2)_{1-100}$-0-Si$(OCH_3)_2$—$(CH_2)_3$NH cyclo-$C_6H_{11}$ and also partial hydrolyzates thereof, while a partial hydrolyzate of $H_2N(CH_2)_3$—Si$(OC_2H_5)_2$—O—Si$(CH_3)$ $(OC_2H_5)_2$ is particularly preferable.

Organosilicon compounds comprising units of formula (X) are commercially available products and/or obtainable by routine methods of silicon chemistry.

Examples of amines of formula (IX) are cyclohexylamine, tri-ethylamine, trioctylamine, butylamine, dodecylamine, diethyl-n-propylamine, cyclohexylmethylamine, 2-aminoethanol, 2-amino-n-propanol, 2-amino-2-methyl-1-propanol, 2-dimethylamino-2-methyl-1-propanol, N,N-diethylethanolamine, ethylenediamine, cocofatty amine, cocofatty methylamine, N,N-dimethylethanol-amine and aniline.

When component (E) is used, organosilicon compounds comprising units of formula (X) are preferably used.

When the compositions of the present invention contain component (E), the amounts are preferably from 0.001 to 10 parts by weight, preferably from 0.01 to 1 part by weight, all based on 100 parts by weight of the composition according to the present invention. The compositions of the present invention preferably do contain component (E).

The organosilicon compounds (E) optionally used according to the present invention may also perform the function of a curing catalyst or cocatalyst in the compositions of the present invention and may further act as adhesion promoters and/or as water scavengers.

Examples of fillers (F) are nonreinforcing fillers, i.e., fillers having a BET surface area of up to 50 m$^2$/g, such as quartz, diatomaceous earth, calcium silicate, zirconium silicate, zeolites, metal oxide powders such as oxides of aluminum, of titanium, of iron or of zinc, and/or mixed oxides thereof; barium sulfate, calcium carbonate, gypsum, silicon nitride, silicon carbide, boron nitride, glass powder, and plastics powder such as polyacrylonitrile powder; reinforcing fillers, i.e., fillers having a BET surface area of more than 50 m$^2$/g, such as pyrogenically produced silica, precipitated silica, precipitated calcium carbonate, carbon black such as furnace and acetylene blacks and silicon-aluminum mixed oxides of large BET surface area; fibrous fillers such as asbestos and also synthetic-polymer fibers. The recited fillers may be in a hydrophobicized state, for example due to treatment with organosilanes/organosiloxanes or due to etherification of hydroxyl groups into alkoxy groups. When fillers (F) are used, it is preferable for hydrophilic pyrogenic silica, precipitated calcium carbonate and ground calcium carbonate to be selected.

When the compositions of the present invention contain component (F), the amounts are preferably from 1 to 80 parts by weight, more preferably from 5 to 65 parts by weight, all based on 100 parts by weight of composition according to the present invention. The compositions of the present invention preferably do contain component (F).

The adhesion promoter (G) optionally used in the compositions of the present invention may comprise silanes and organopolysiloxanes having functional groups, for example those with glycidoxypropyl, ureidopropyl or methacryloyloxypropyl radicals. Examples of adhesion promoters (G) are epoxysilanes, such as glycidoxypropyltrimethoxysilane, glycidoxypropyl-methyldimethoxysilane, glycidoxypropyltriethoxysilane or glycidoxypropylmethyldiethoxysilane, tris[3-(trimethoxysilyl)propyl]isocyanurate, 2-(3-triethoxysilylpropyl)maleic anhydride, N-(3-trimethoxysilyl-propyl)urea, N-(3-triethoxysilylpropyl)urea, N-(trimethoxysilylmethyl)urea, N-(methyldimethoxysilymethyl)urea, N-(3-triethoxysilylmethyl)urea, N-(3-methyldiethoxysilylmethyl)urea, O-methylcarbamatomethylmethyldimethoxysilane, O-methylcarbamatomethyltrimethoxysilane, O-ethylcarbamatomethyl-methyldiethoxysilane, O-ethylcarbamatomethyltriethoxysilane, 3-methacryloyloxypropyltrimethoxysilane, methacryloyloxymethyl-trimethoxysilane, methacryloyloxymethylmethyldimethoxysilane, methacryloyloxymethyltriethoxysilane, methacryloyloxymethyl-methyldiethoxysilane, 3-acryloyloxypropyltrimethoxysilane, acryloyloxymethyltrimethoxysilane, acryloyloxymethylmethyl-dimethoxysilane, acryloyloxymethyltriethoxysilane and acryloyloxymethylmethyldiethoxysilane and also partial condensates thereof.

When the compositions of the present invention contain component (G), the amounts are preferably from 0.01 to 10 parts by weight, more preferably from 0.1 to 2.5 parts by weight, all based on 100 parts by weight of the composition. The compositions of the present invention preferably contain no component (G) except when calcium carbonates are used as filler. When the compositions of the present invention contain calcium carbonate as filler (F), the use of component (G) is preferable.

Examples of plasticizers (H) are room temperature liquid trimethylsiloxy-endblocked dimethylpolysiloxanes, in particular having viscosities at 25° C. in the range between 5 and 10,000 mPas, and also high-boiling hydrocarbons, for example paraffin oils or mineral oils consisting of naphthenic and paraffinic units.

When the compositions of the present invention contain component (H), the amounts are preferably from 1 to 50 parts by weight, more preferably from 10 to 35 parts by weight, all based on 100 parts by weight of the composition according to the present invention. The compositions of the present invention preferably do contain component (H).

The further crosslinkers (J) optionally used in the compositions of the present invention may comprise any desired crosslinker having at least three condensation-capable radicals, for example silanes with at least three organyloxy groups that differ from component (B).

It is most preferable for the further crosslinkers (J) optionally used in the compositions of the present invention to comprise silane crosslinkers such as tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 1,2-bis(trimethoxysilyl)ethane, 1,2-bis(triethoxysilyl)ethane, methyltri-acetoxysilane, ethyltri-acetoxysilane, methyltris(methylethylketoximo silane and vinyltris(methylethylketoximo)silane and also partial hydrolyzates thereof.

The further crosslinkers (J) optionally used in the compositions according to the present invention are commercially available products and/or obtainable by methods known in silicon chemistry.

When the compositions of the present invention contain further crosslinkers (J), the amounts are preferably from 0.1 to 10 parts by weight, more preferably from 0.2 to 5 parts by weight and most preferably from 0.5 to 3 parts by weight, all based on 100 parts by weight of the composition according to the present invention. The compositions of the present invention preferably do contain crosslinker (J).

Examples of additives (K) are pigments, dyes, scents, oxidation inhibitors, agents for influencing the electrical properties such as conductive carbon black, flame retardants, light stabilizers and agents for prolonging the skin formation time, such as silanes having an SiC-bonded mercaptoalkyl radical, cell-producing agents, e.g., azodicarbonamide, heat stabilizers and thixotropic agents, for example polyethers, biocides such as fungicides, bactericides, acaricides, and modulus regulators such as polydimethylsiloxanes having only one OH end group, and also agents for improving the stability in storage, such as alkylphosphonic acids.

When the compositions of the present invention contain component (K), the amounts are preferably from 0.0001 to 10 parts by weight, more preferably from 0.001 to 10 parts by weight, all based on 100 parts by weight of the composition. The compositions of the present invention preferably do contain component (K).

Examples of solvents (L) are toluene, xylene, ethanol and methanol. These may be present in one or more of constituents (A) to (K) as impurities, for example due to the respective method of synthesis, or be added intentionally, as when, for instance, component (C) is to be used as solvent mixture.

When the compositions of the present invention contain solvent (L), the amounts are preferably from 0.01 to 2 parts by weight, more preferably from 0.1 to 1 part by weight, all based on 100 parts by weight of the composition according to the present invention. The compositions of the present invention preferably do not contain any solvent (L).

The compositions of the present invention are preferably obtainable by use of (A) organosilicon compounds containing units of formula (II), (B) compounds of formula (I), (C) compounds containing units of formulae (III), (IV) and (V) in amounts altogether of at least 80 mol %, with the proviso that they include at least 20 mol % of units of formula (V), optionally
(D) catalysts,
optionally
(E) basic nitrogen compounds,
optionally
(F) fillers,
optionally
(G) adhesion promoters,
optionally
(H) plasticizers,
optionally
(J) further crosslinkers,
optionally
(K) additives, and
optionally
(L) solvents.

The compositions of the present invention are preferably further obtainable by use of (A) essentially linear, OH-terminated organopolysiloxanes, (B) compounds of formula (I) where the heterocycles on which said radicals A are based comprise pyrrolidine, piperidine, tetrahydro-1,4-oxazine, tetrahydro-1,4-thiazine, tetrahydro-1,4-diazine and 1-methyltetrahydro-1,4-diazine, in particular tetrahydro-1,4-oxazine, (C) compounds containing units of formulae (III), (IV) and (V) in amounts of altogether at least 98.5 mol %, with the proviso that they include from 25 to 50 mol % of units of formula (V), (D) catalysts,
(E) basic nitrogen compounds,
optionally
(F) fillers,
optionally
(G) adhesion promoters,
optionally
(H) plasticizers,
optionally
(J) further crosslinkers,
optionally
(K) additives, and
optionally
(L) solvents.

It is particularly preferable to produce the compositions of the present invention without use of any constituents beyond said components (A) to (L).

The individual constituents of the compositions according to the present invention may each comprise one species of such a constituent as well as a mixture of two or more different species of such constituents.

To prepare the compositions of the present invention, all the constituents may be mixed with one another in any desired order. This mixing may take place at room temperature and the pressure of the ambient atmosphere, i.e., at about 900 to 1100 hPa, or under a reduced pressure of about 20 hPa to 800 hPa. If desired, however, this mixing may also be effected at higher temperatures, for example at temperatures in the range from 35 to 135° C. Heating or cooling may be applied as desired.

The present invention further provides a method of producing the composition of the present invention by mixing the individual components in any desired order. The mixing of individual components in the manner of the present invention preferably takes place in the very substantial absence of water from the ambient atmosphere, as may for example be achieved by blanketing with dry air.

Component (C) of the present invention may be mixed in at any desired stage, for example before the admixture of compound (B) into organosilicon compound (A), before or after the admixture of fillers (F) or else as last component, in each case moreover before or after devolatilization. The admixture preferably takes place before that of fillers (F).

The order of mixing polymer, crosslinker and plasticizer is immaterial. For convenience of processing, it is preferable to introduce polymer (A) first as initial charge with or without plasticizer (H) and then to add component (B) with or without crosslinker (J) and preferably to add component (C) subsequently thereto.

When fillers (F) are added, it is preferable for component (A), component (B), component (C), optionally component (J) and optionally component (E) to be intimately mixed with one another before filler (F), preferably hydrophilic silica, is added.

Preferably, when component (E) is used, the ratio of (E) to (F) is chosen such that at least 0.2 µmol of basic nitrogen compounds (E) is used per square meter of the BET surface area of filler (F).

When fillers (F) and plasticizers (H) are added, it is preferable for the mixture of polymer (A), plasticizer (H), component (C) and component (B) and optionally also crosslinker (J) to be intimately mixed by stirring.

When hydrophilic pyrogenous silica is added as fillers (F), it is preferable for component (A), plasticizer (H), component (C), component (B) and optionally component (J) to be intimately mixed with one another before the addition of filler (F) until at least 90% of the OH groups of organosilicon compound (A) have reacted with said constituents (B) and (J), while component (E) is added at any desired stage before the addition of the pyrogenous silica. The ratio of (E) to (F) is preferably chosen such that at least 0.2 µmol of basic nitrogen in compounds (E) is used per square meter of the BET surface area of the filler.

It is further generally immaterial at which stage catalyst (D) is added. Sensibly, however, the catalyst will only be added at the end, since it is then that the mixture is activated. Excessively long mixing of already very reactive sealant compositions is sought to be avoided by the skilled practitioner, since complete exclusion of moisture in the production of the mixture is difficult or at least uneconomical. It may sometimes also be necessary for the catalyst not to come into contact with a polymer-crosslinker mixture which still contains major quantities of unconverted OH groups, since premature crosslinking of the mixture may then occasionally take place. This is another reason why the skilled practitioner avoids adding the catalyst too early. Most preferably, the skilled practitioner will only add the crosslinking catalyst at the start of the mixture-producing process when this crosslinking catalyst is also a catalyst for reacting the OH polymers with the crosslinker.

Mixing the constituents may be interrupted at any stage for any desired period. More particularly, an interruption of at least about 1 minute after mixing said organosilicon compound (A) with compound (B) and optionally component (E) and/or optionally crosslinker (J) is preferable, while component (C) is preferably only added after the interruption.

After all the desired constituents have been mixed, the mixture is preferably devolatilized and filled into moisture-tight containers.

The crosslinkable compositions of the present invention may be obtained in the manner of the present invention not only as a batch operation but also as a continuous operation.

The continuous mode of operation is preferably carried out by first mixing organosilicon compound (A) with compound (B) and also, optionally, plasticizer (H) in a continuous manner, preferably using a dynamic mixer, in which case the reaction time of organosilicon compound (A) with compounds (B) is from 1 to 60 minutes, before any further mixture constituents are mixed in. Reaction times are adjustable, for example, by specific engineering of line lengths and line cross section in the continuous plant. The reaction time in the continuous process of the present invention is preferably such that at least 90% of the OH groups of said organosilicon compound (A) will have reacted with compounds (B). This may be followed by the continuous admixture, for example with a static mixer, of the organosilicon compound (C) of the present invention and also optionally of any crosslinker (J), basic nitrogen compound (E), adhesion promoter (G) and plasticizer (H).

If desired, this is followed, preferably without intervening storage, by the continuous admixture of fillers (F), such as finely divided silica, in which case rotor/stator system mixers may be used for example.

Prior to the possible admixture of catalyst (D) and of additives (K), the composition of the present invention may be devolatilized in a continuous manner, for example by means of a twin-screw extruder.

The compositions of the present invention preferably comprise one-component compositions which are storable in the absence of water, which cure on admission of water and which are generally referred to as RTV-1 compounds among those skilled in the art.

The usual water content of air is sufficient to crosslink the compositions of the present invention. The compositions of the present invention are preferably crosslinked at room temperature. Crosslinking of the compositions according to the present invention may also be, if desired, carried out at higher or lower temperatures than room temperature, for example at from −5° to 15° C. or at from 30° to 50° C. and/or using concentrations of water that exceed the normal water content of air.

Crosslinking is preferably carried out at a pressure of 100 to 1100 hPa, in particular at the pressure of the ambient atmosphere.

The present invention further provides shaped articles obtained by crosslinking the compositions of the present invention.

The compositions of the present invention can be used for any purpose for which the compounds which are storable in the absence of water and crosslink on admission of water at room temperature to form elastomers can be used.

The compositions of the present invention are thus very useful as, for example, sealants for gaps, including vertical gaps, and similar empty spaces of, for example, 10 to 40 mm internal width, as for example in buildings, land vehicles, water craft and aircraft, or as adhesives or putties, for example in window construction of in the making of aquariums or glass cabinets, and also, for example, in the production of protective coverings, including those for surfaces exposed to the constant action of freshwater or seawater, or anti-slip coverings, or of shaped elastomeric articles and also for the insulation of electric or electronic devices.

The compositions of the present invention are advantageous because they are easy to make and are very stable in storage for a prolonged period.

The compositions of the present invention are advantageous because they evolve no or but minimal fractions of products having toxicological concerns.

The compositions of the present invention are further advantageous because they fully cure uniformly even in a thick layer.

The compositions of the present invention are advantageous because the use of aqueous smoothing agents does not leave any readily visible spots on the sealant surface.

The compositions of the present invention are further advantageous because their skin formation time is controllable between very wide limits.

The compositions of the present invention are further advantageous because they are obtainable in a completely continuous manner.

The compositions of the present invention are advantageous because their cured products retain their mechanical stability for a very long time in hot moist surroundings.

The compositions of the present invention are further advantageous because they cure to nontacky materials even under simultaneously high relative humidity and elevated temperature.

The compositions of the present invention are additionally advantageous because their modulus in the cured state can be intentionally varied across an extremely wide range by varying the type and proportion of compound (C). All the while, the rheological properties of the uncured compositions remain virtually unchanged, which is generally desirable.

The densities of the present invention were determined in accordance with DIN ISO 2811-1.

In the examples described hereinbelow, viscosities relate to a temperature of 25° C. Unless otherwise stated, the examples hereinbelow are carried out at a pressure of the ambient atmosphere, i.e., for instance at 1000 hPa, and at room temperature, i.e., at about 23° C., or at a temperature as results on combining the reactants at room temperature without additional heating or cooling, and at a relative humidity of about 50%. Parts and percentages are further all by weight, unless otherwise stated.

The Shore A hardness is determined in accordance with DIN (German Industrial Standard) 53505-87.

The modulus is the stress value at 100% strain of a test specimen in accordance with DIN 53504-85 S2.

Viscosities hereinbelow were determined in accordance with DIN 53019.

In what follows, Me represents the methyl radical, Et represents the ethyl radical, Oct represents the octyl radical and AMP represents the aminopropyl radical.

Example 1

300 g of an α,ω-dihydroxypolydimethylsiloxane having a viscosity of 80,000 mPa's (commercially available under the designation "Polymer FD 80" from Wacker Chemie AG, D-Munich), 130 g of an α,ω-bis(trimethylsiloxy)polydimethylsiloxane having a viscosity of 1000 mPa's (commercially available under the designation "Weichmacher 1000" from Wacker Chemie AG, D-Munich), 9 g of 4-(triethoxysilylmethyl)tetrahydro-1,4-oxazine, 1 g of a product C1 consisting of 16.0 mol % of units of the formula $MeSi(OEt)_2O_{1/2}$, 46.4 mol % of units of the formula $MeSi(OEt)O_{2/2}$, 36.5 mol % of units of the formula $MeSiO_{3/2}$, 0.2 mol % of units of the formula $Me_2Si(OEt)O_{1/2}$ and 0.9 mol % of units of the formula $Me_2SiO_{2/2}$, 8 g of 3-aminopropyltriethoxysilane (commercially available under the designation GENIOSIL® GF 93 from Wacker Chemie AG, D-Munich), 2 g of vinyltriethoxysilane (commercially available under the designation GENIOSIL® GF 56 from Wacker Chemie AG, D-Munich) and 5 g of tetraethyl silicate (commercially available under the designation "Silikat TES 28" from Wacker Chemie AG, D-Munich) were placed in a planetary mixer as initial charge and mixed for 30 minutes.

This was followed by admixing 45 g of a pyrogenous silica having a specific BET surface area of 150 m²/g (commercially available under the designation HDK® V15 from Wacker Chemie AG, D-Munich) and complete homogenizing at a pressure of 50 hPa. Lastly, 1 g of a 1:1 solution of octylphosphonic acid in methyltrimethoxysilane and 2 g of a reaction product of dibutyltin diacetate and tetraethoxysilane (commercially available under the designation "Katalysator 41" from Wacker Chemie AG, D-Munich) were added followed by a further 5 min of homogenizing at a pressure of about 50 hPa (absolute).

The RTV1 compound thus obtained was filled into moisture-tight commercially available polyethylene cartridges.

The product C1 was obtained by hydrolysis and condensation of methyltriethoxysilane. At 25° C. it had a density of 1.09 g/cm³ and a viscosity of 28.4 mPa's.

Example 2

The procedure described in Example 1 was repeated except that 2 g of the product C1 were used.

Example 3

The procedure described in Example 1 was repeated except that 5 g of the product C1 were used.

Example 4

The procedure described in Example 1 was repeated except that 10 g of the product C1 were used.

Example 5

The procedure described in Example 1 was repeated except that 15 g of the product C1 were used.

Example 6

The procedure described in Example 1 was repeated except that the 1 g of product C1 was replaced by 5 g of a product C2 consisting of 19.8 mol % of units of the formula $MeSi(OMe)_2O_{1/2}$, 47.8 mol % of units of the formula $MeSi(OMe)O_{2/2}$, 31.6 mol % of units of the formula $MeSiO_{3/2}$, 0.2 mol % of units of the formula $Me_2Si(OMe)O_{1/2}$ and 0.6 mol % of units of the formula $Me_2SiO_{2/2}$.

The product C2 was obtained by hydrolysis and condensation of methyltrimethoxysilane. At 25° C. it had a density of 1.14 g/cm³ and a viscosity of 31.3 mPa's.

Example 7

The procedure described in Example 6 was repeated except that 15 g of the product C2 were used.

Example 8

The procedure described in Example 1 was repeated except that the 130 g of the α,ω-bis(trimethylsiloxy)polydimethylsiloxane having a viscosity of 1000 mPa's were replaced by 100 g of α,ω-bis(trimethylsiloxy)polydimethylsiloxane having a viscosity of 1000 mPa's and 30 g of the product C1.

Example 9

The procedure described in Example 3 was repeated except that the 130 g of α,ω-bis(trimethylsiloxy)polydimethylsiloxane having a viscosity of 1000 mPa's were replaced by 80 g of α,ω-bis(trimethylsiloxy)polydimethylsiloxane having a viscosity of 1000 mPa's and 50 g of a hydrocarbon mixture having a kinematic viscosity of 6.2 mm²/sec at 40° C., a viscosity density constant of 0.79 and a boiling range of 300 to 370° C.

Example 10

The procedure described in Example 1 was repeated except that the 1 g of product C1 was replaced by 5 g of a product C3 consisting of 15.9 mol % of units of the formula $MeSi(OMe)_2O_{1/2}$, 11.4 mol % of units of the formula $OctSi(OMe)_2O_{1/2}$, 44.3 mol % of units of the formula $MeSi(OMe)O_{2/2}$ and $OctSi(OMe)O_{2/2}$, 28.4 mol % of units of the formula $MeSiO_{3/2}$ and $OctSiO_{3/2}$.

The product C3 was obtained by co-hydrolysis and co-condensation of methyltrimethoxysilane and i-octyltrimethoxysilane. At 25° C. it had a density of 1.03 g/cm³ and a viscosity of 13.3 mPa's.

Example 11

The procedure described in Example 3 was repeated except that the 45 g of pyrogenous silica were replaced by using only 30 g of pyrogenous silica and an additional 400 g of a coated calcium carbonate having a median particle size (d50) of 1.7 µm and a sieve residue of less than 0.01% (20 micrometer sieve, ISO 787/7) (commercially available under the name "Omyabond 520-OM" from Omya International AG, D-Cologne) and also 9 g of tris[3-(trimethoxysilyl)propyl]isocyanurate (commercially available under GENIOSIL® GF 69 from Wacker Chemie AG, D-Munich).

Comparative Example A

The procedure described in Example 3 was repeated except that the 5 g of product C1 were replaced by 5 g of a methyltrimethoxysilane hydrolyzate oligomer consisting of 37.5 mol % of units of the formula MeSi(OMe)$_2$O$_{1/2}$, 45.5 mol % of units of the formula MeSi(OMe)O$_{2/2}$, 17.0 mol % of units of the formula MeSiO$_{3/2}$.

Comparative Example B

The procedure described in Example 3 was repeated except that the 5 g of product C1 were replaced by 5 g of a hydrolyzate of aminopropyltriethoxysilane, said hydrolyzate consisting of 38.3 mol % of units of the formula AMPSi(OMe)$_2$O$_{1/2}$, 45.0 mol % of units of the formula AMPSi(OMe)O$_{2/2}$ and only up to 16.7 mol % of units of the formula AMPSiO$_{3/2}$.

Comparative Example C

The procedure described in Example 3 was repeated except that the 5 g of product C1 were replaced by 5 g of a tetraethoxysilane hydrolyzate of the kind commercially available under the designation TES 40 from Wacker Chemie AG, D-Munich.

Example 12

The mixtures obtained in Examples 1 to 11 and Comparative Examples A to C were each used to spread out, on a polyethylene film, sheets 2 mm in thickness which, after curing for one day, were detached from the film and suspended such that all sides were open to the air for a further 6 days, so that the samples were fully cured in altogether 7 days. The relative humidity was set to 50%, while the temperature was regulated to 23° C. These sheets were then die-cut to cut out test specimens of the S2 shape of DIN 53504-85, and the respective modulus was determined.

For hardness determination, the mixtures prepared in Examples 1 to 11 and Comparative Examples A to C were used to form test specimens 6 mm in thickness, which were cured for 7 days on PE films at a relative humidity of 50% and a temperature of 23° C. by reaction with the ambient moisture in the air.

The samples all cured into nontacky elastomeric materials.

To determine the hardness change of the test specimens, they were subsequently suspended for 7 days in a conditioning cabinet at a temperature of 50° C. and a relative humidity of about 95%. Prior to the hardness determination, the test specimens stored in the conditioning cabinet were conditioned at about 23° C. and about 50% relative humidity for about 30 minutes after removal.

The mechanical parameters determined are reported in Table 1.

TABLE 1

| Example | Initial hardness (Shore A) | Hardness after 7 days at 50° C., 95% rh (Shore A) | Modulus (MPa) |
| --- | --- | --- | --- |
| 1 | 22 | 7 | 0.38 |
| 2 | 23 | 9 | 0.39 |
| 3 | 24 | 13 | 0.41 |
| 4 | 25 | 17 | 0.44 |
| 5 | 26 | 21 | 0.46 |
| 6 | 24 | 10 | n.d. |
| 7 | 25 | 16 | n.d. |
| 8 | 33 | 34 | 0.56 |
| 9 | 20 | 14 | n.d. |
| 10 | 23 | 12 | n.d. |
| 11 | 14 | 13 | n.d. |
| A | 18 | 2 | n.d. |
| B | 19 | 3 | n.d. |
| C | 20 | 8 | n.d. |

(n.d. = not determined)

Surprisingly, Examples 1 to 11, which are in accordance with the present invention, evince the desired low reduction in hardness values. That is, the elastomeric properties did survive under the storage conditions mentioned.

What is claimed is:

1. A condensation-crosslinkable composition, comprising:
   (A) organosilicon compound(s) having at least two Si-bonded OH groups,
   (B) heterocyclic compound(s) of the formula $$A[CR^1{}_2SiR_a(OR^2)_{3-a}]_x \qquad (I),$$

where
   A is a heterocyclic radical AH$_x$, said radical containing one or more ring-forming elements of main groups 3 and/or 5 of the periodic table, and having x hydrogen atoms replaced by chemical bonds to the CR$^1{}_2$ radical in the formula (I), wherein at least one of these bonds is situated on a ring-forming element of main group 3 or 5,
   R are identical or different, monovalent, optionally substituted hydrocarbyl radicals,
   R$^1$ are identical or different, and are hydrogen or monovalent, optionally substituted hydrocarbyl radicals,
   R$^2$ are identical or different monovalent, optionally substituted hydrocarbyl radicals,
   a represents 0 or 1, and
   x represents 1, 2 or 3,
   and/or partial hydrolyzates thereof
   and
   (C) at least one compound containing units of the formulae $$R^5Si(OR^4)_2O_{1/2} \qquad (III),$$

$$R^5Si(OR^4)O_{2/2} \qquad (IV), \text{ and}$$

$$R^5SiO_{3/2} \qquad (V),$$

where
   R$^4$ are each independently an alkyl radical, and
   R$^5$ are each independently a hydrocarbyl radical with the proviso that the compound (C) contains at least 20 mol % of units of formula (V).

2. The composition of claim 1, wherein a is 0 and x is 1 or 2.

3. The composition of claim 1, wherein organosilicon compounds (A) contain units of the formula $$R^3{}_b(OH)_cSiO_{(4-b-c)/2} \qquad (II),$$

where
   R$^3$ each independently are the same or different and are optionally substituted hydrocarbyl radicals which may be interrupted by oxygen atoms,
   b is 0, 1, 2 or 3, and
   c is 0, 1, 2 or 3,
   with the proviso that the sum of b+c is ≤3 and at least two condensation-capable radicals OH are present per molecule.

4. The composition of claim 1, wherein said compound(s) (C) contain units of formulae (III), (IV) and (V) in amounts altogether of at least 80 mol %.

5. The composition of claim 1, wherein said compound(s) (C) contain from 20 to 60 mol % of units of formula (V), from 5 to 30 mol % of units of formula (III) and from 20 to 50 mol % of units of formula (IV).

6. The composition of claim 1, wherein said compound(s) (C) have a density of 0.9 to 1.3 g/cm³ at 25° C.

7. The composition of claim 1, wherein said composition contains component (C) in amounts of 0.01 to 50 parts by weight, based on 100 parts by weight of component (A).

8. The composition of claim 3, wherein the composition comprising:
(A) organosilicon compounds containing units of formula (II),
(B) compounds of formula (I),
(C) compounds containing units of formulae (III), (IV) and (V) in amounts altogether of at least 80 mol %, with the proviso that they include at least 20 mol % of units of formula (V),
(D) optionally catalysts,
(E) optionally basic nitrogen compounds,
(F) optionally fillers,
(G) optionally adhesion promoters,
(H) optionally plasticizers,
(J) optionally further crosslinkers,
(K) optionally additives, and
(L) optionally solvents.

9. The composition of claim 1, wherein the composition is obtained by admixing
(A) essentially linear, OH-terminated organopolysiloxanes,
(B) compounds of formula (I) where the heterocyclic radicals of radicals A comprise at least one of pyrrolidine, piperidine, tetrahydro-1,4-oxazine, tetrahydro-1,4-thiazine, tetrahydro-1,4-diazine and 1-methyltetrahydro-1,4-diazine,
(C) compounds containing units of formulae (III), (IV) and (V) in amounts altogether at least 98.5 mol %, with the proviso that they include from 25 to 50 mol % of units of formula (V),
(D) catalysts,
(E) basic nitrogen compounds,
(F) optionally fillers,
(G) optionally adhesion promoters,
(H) optionally plasticizers,
(J) optionally further crosslinkers,
(K) optionally additives, and
(L) optionally solvents.

10. The composition of claim 9, wherein the heterocyclic radical comprises tetrahydro-1,4-oxazine.

11. The method of producing the composition of claim 1, comprising mixing the individual components in any desired order.

12. A shaped article obtained by crosslinking a composition of claim 1.

* * * * *